US005784503A

United States Patent [19]
Bleecker, III et al.

[11] Patent Number: 5,784,503
[45] Date of Patent: *Jul. 21, 1998

[54] CHECK READER UTILIZING SYNC-TAGS TO MATCH THE IMAGES AT THE FRONT AND REAR FACES OF A CHECK

[75] Inventors: John A. Bleecker, III, Canton; George E. Reasoner, Jr., Tecumseh; Daniel R. Edwards, Ypsilanti; Gerald R. Smith, Farmington, all of Mich.

[73] Assignee: Unisys Corp, Blue Bell, Pa.

[*] Notice: The term of this patent shall not extend beyond the expiration date of Pat. No. 5,528,705.

[21] Appl. No.: 418,317

[22] Filed: Apr. 7, 1995

Related U.S. Application Data

[63] Continuation-in-part of Ser. No. 296,578, Aug. 26, 1994, Pat. No. 5,528,705.

[51] Int. Cl.⁶ ........................................................ G06K 9/00
[52] U.S. Cl. .......................... 382/306; 348/159; 382/137; 382/138; 382/139; 382/140
[58] Field of Search .............................. 382/137, 138, 382/139, 140, 169, 190, 233, 239, 250, 305; 348/17, 159, 348; 358/261.1, 261.3, 335

[56] References Cited

U.S. PATENT DOCUMENTS

| 4,523,330 | 6/1985 | Cain | 382/164 |
|---|---|---|---|
| 5,134,661 | 7/1992 | Reinsch | 382/100 |
| 5,157,740 | 10/1992 | Klein | 382/271 |
| 5,164,993 | 11/1992 | Capozzi | 382/132 |
| 5,329,616 | 7/1994 | Silverbrook | 382/233 |
| 5,528,705 | 6/1996 | Reasoner | 382/306 |

OTHER PUBLICATIONS

Rafael C. Gonzalez and Richard E. Woods, Digital Image Processing, Addison–Wesley Publishing, 1992.

*Primary Examiner*—Michael T. Razavi
*Assistant Examiner*—Marc Bobys
*Attorney, Agent, or Firm*—M. Starr; J. McCormick

[57] ABSTRACT

An electronic document-imaging arrangement wherein imaging means generates imaging-bits representing a given document and transfers these bits on a "per-document basis" to various successive electronic processing stages and, finally, to a data base storage unit (DBS); this arrangement also including a tag stage for creating tag bits unique for each such imaged document; these tag bits to be transferred with the imaging bits for each document to each such processing stage that handles the imaging bits, on a per document basis, and finally to DBS interface means for final matching and removal of the tag bits.

21 Claims, 9 Drawing Sheets

CHECK READER UTILIZING SYNC-TAGS TO MATCH THE IMAGES AT THE FRONT AND REAR FACES OF A CHECK

This is a continuation-in-part of U.S. Ser. No. 296,578, filed Aug. 26, 1994, and issuing Jun. 18, 1996 as U.S. Pat. No. 5,528,705; and we herewith claim priority from the US Filing thereof.

This invention relates to automatic high-speed document imaging/processing; and especially to means for identifying document images.

BACKGROUND, FEATURES

Workers are familiar with document processing (e.g., check processors for automatic sort) that involve creating an electronic digital image of each document as it passes an imaging station (e.g., as simplistically illustrated in FIG. 1A). In FIG. 1A there is shown a financial document sorting system having a typical document sorter 12, which in the preferred embodiment of this invention, comprises a model DP1800 sorter which is manufactured by the UNISYS Corporation of Blue Bell, Pennsylvania.

Sorter 12 contains a track 14 along which a plurality of financial documents 16 (e.g., checks) passes. Sorter 12 includes a magnetic character reader 18 and magnetic strip character controller 20, as well as a document holder 22 and a pipelined image processor (imaging station) 24.

Controller 20 is coupled to reader 18 via signals on a bus 26, to a host computer 28 by signals on a bus 30, and to the pipelined image processor 24 by signals on a bus 32. A computer 28 is coupled to an image storage module 34 by signals on a bus 36, while image storage module 34 is also coupled to the pipelined image processor 24 and to a plurality of workstations 38 via signals on a buses 40 and 42, respectively.

In operation, documents 16 sequentially pass reader 18 which reads a typical code appearing upon the usual MICR codeline strip which is normally placed upon each of the documents 16. The code read-out is then sent to computer 28 by signals on bus 30 for storage therein, and also to processor 24 by signals on bus 32. As each document 16 further proceeds, it passes imaging station 24 which creates a digital electronic image of the document, and sends this processed image data, via signals on bus 40, to image storage module 34 for storage therein. After passing station 24, each document is then sorted, by sorter 12, in the usual way (based on the contents of the MICR codeline) and is held at document holder 22.

After a typical prescribed block of such documents 16 has been sorted as aforedescribed, workstations 38, via signals on bus 42, may sequentially request document image data from storage module 34. This image data is then downloaded to a workstation 38, via signals on bus 42, along with associated magnetic code data obtained from host computer 28.

After such image data is so captured at a workstation 38, an operator may electronically enter the dollar amount (e.g., courtesy amount) on each document and electronically resolve any associated inconsistencies. Each image's dollar amount and associated corrections then form a single record which is sent to computer 28, via signals on bus 42, where it may later be accessed for use in automatically inscribing the dollar amount and corrections upon the document. Therefore, the aforementioned document sort system 10 substantially eliminates manual handling of an individual document 16, once its associated dollar amount is so verified and inscribed, to thereby increase the efficiency, speed and timeliness of the overall document sorting system 10.

Compression Stages

Within Image Processor 24 in FIG. 1A is placed one of "n" JPEG Processing/Compression stages (24-A). Two of these JPEG Processing/Compression paths are implemented on a Histogram/Compressor printed circuit board assembly (PCBA) shown in FIG. 1C.

According to a feature hereof, Image Processor 24 of FIG. 1 is characterized by an Image Digitizer unit (D of FIG. 2) for analog to digital conversion of the captured image, a Normalizer/Scaler (N/S Set, FIG. 2) for normalization, delineation and scaling of the video image, a set of "n", parallel JPEG Processing/Compression units (J1 of FIG. 2 and 24-A of FIG. 1) for image processing/JPEG compression and a JPEG Compressed Data Buffer unit (JCDB in FIG. 2) for collection and temporary storage of compressed images from the JPEG Processing/Compression units. [Note "JPEG" refers to a compression standard by the "Joint Photographic Experts Group".]

These functions are implemented especially to meet the performance requirements of a high speed check imaging system and to minimize the cost of the system by reducing the amount of "parallel hardware" needed to compress images. A preferred Processing/Compression Stage (for JPEG) is indicated in FIG. 1C.

The JPEG compression hardware performs image processing on a 128 grey level, scaled image before executing a two-pass JPEG compression. Scaling can range from 137.5 dpi to 50 dpi in steps of 12.5 dpi. This two-pass compression is designed—according to this feature—to reduce images to a predictable "packet size" apt for use in the entire high speed check imaging system. These functions of the JPEG "P/C" (Processing/Compression) hardware, (detailed below) must be performed, here, in real time on check images as they move down a high speed check sorter track at an approximate rate of 1800 checks per minute.

It is not possible, within the environment of present high speed check-imaging systems (detailed below), for a single JPEG "P/C" (Processing/Compression) path to process every check in real time. Therefore, one needs multiple JPEG "P/C" paths, operating in parallel, are needed. To reduce the time required for each Processing/Compression path to operate on an image (and therefore reduce the number of parallel paths needed to maintain system performance), many of the required functions of the JPEG "P/C" path have been implemented in hardware. A detailed explanation of such functions is described below.

System Environment

A JPEG "P/C" (process/compression) path as here contemplated, will perform image processing and real time JPEG compression of normalized and scaled images of documents (e.g. checks) captured in a check sorter at an average rate of 1800 checks per minute. The diagram in FIG. 2 indicates conditions under which the JPEG "P/C" path operates and the performance required of this unit to maintain overall system performance.

FIG. 2 shows the processing of a sample of check images as they move left to right across the page, similar to the way the checks would move through the check sorter. Here, track speed of the sorter assumed to be 300 inches per second. This means that a check that is 6 inches long will take 20 ms to pass a fixed point on the sorter track; here, checks can range in length from 5.75 inches to 9 inches (19 ms to 30 ms), with gaps between checks ranging from 1.5 inches (5 ms) to several inches).

The check images are captured by a camera preferably comprised of a vertical, 1024-element CCPD array which samples 256 grey levels per pixel (8 bits) with a resolution of 200 pixels per inch. In the vertical direction, the camera can capture images up to 5.12 inches high. The 1024 element array takes a snapshot of the check every 16.66 us as it moves down the sorter track, yielding a horizontal capture resolution of 200 pixels per inch. These 1024 pixel scans (captured every 16.66 us by the CCPD array) are divided into eight 128 pixel channels (shown as CH0 through CH7 in FIG. 2, each composed of 128 pixel scans). Hardware in the Camera/Digitizer D converts each 128 pixel scan into eight serial streams of pixels, with one pixel being output approximately every 130 ns.

The N/S (Normalizer/Scaler) hardware next normalizes the pixel values from the 1024 CCPD elements and then scales the image down. The maximum resolution after scaling is 137.5 ($^{11}/_{16}$ ths scaling of 200 dpi captured image) pixels per inch in both dimensions (e.g., see example shown in FIG. 2). In this example the 128 pixel scans in each channel are reduced to 88 pixels per scan. The N/S hardware "time-multiplexes" four channel's worth of data onto two, 8-bit serial outputs to the JPEG "P/C" hardware. The 88 pixels from all four "even-numbered" (total of 352 pixels per scan at 137.5 dpi) channels (0, 2, 4, 6) are time-multiplexed along one serial stream, while the pixels from the four "odd" channels (1, 3, 5 and 7) are multiplexed along a second serial stream. The two serial pixel streams operate at 50 ns/pixel (20 MHz) to guarantee that all 352 pixels per scan on each serial path can be transferred to the JPEG "P/C" hardware before the next scan is transferred.

A pair of JPEG "P/C" paths are preferably implemented on an H/C PCB (Histogram/Compressor printed circuit board, as indicated in FIG. 1C). Each process/compression path must detect the image dimensions and perform image processing on the scaled image prior to compression. Selected image processing algorithms require a grey level histogram of the entire image prior to execution. This means the entire image must be buffered (e.g., at 3-1, FIG. 3) and a histogram generated (e.g., at 3-7) before image processing can begin. Once image processing is complete, compression can begin.

The performance of the entire image system is what dictates how the JPEG Processing/Compression hardware must reduce each image to a target packet size; this is why the here-detailed JPEG compression hardware embodiment executes a 2-pass compression. The first pass uses a "standard" QM (Quantization Matrix) for JPEG compression. The results of the first pass compression, as well as the detected image dimensions, are used to pick a second QM for a second, final compression that will reduce the scaled image to the desired compressed packet size.

To maintain system performance, the JPEG Processing/Compression hardware must perform all these functions in real time which equates to generating a JPEG compression packet in 20 ms for a 6-inch check. Because a single JPEG "P/C" path cannot meet these requirements, multiple paths operating in parallel are required. The described H/C PCB was equipped with two independent JPEG "P/C" paths for this purpose (see FIGS. 3, 1C), and the system has locations for up to 8 H/C PCBs (for Front/Rear imaging). This means the system can have as many as 16 JPEG compression paths operating in parallel (e.g. two for each H/C PCB—on each side). For example, FIG. 4 indicates how up to 4 H/Cs can be used on each side (front and back) of the imaging system.

Compression, etc.

In one type of document processor, front and rear images of a document are captured, enhanced, and compressed by two independent mechanisms. Following compression, the front and rear images are combined with additional information specific to the document (previously received from the document processor), and stored in a database, separate from the document processor, for subsequent retrieval.

A hardware/software failure can cause the electronic images in the (front and rear image) processing stages to become unsynchronized; e.g.. Typically, because one or more images are skipped on one side; or, the front and rear image bits may be synchronized with one another, but may not be synchronized with ancillary document information ("collateral document data" that is associated with the image bits). If this condition goes undetected, then the front and/or rear image bits will not be stored with the proper document record in the database.

Thus, it will be understood as useful to have a method of identifying (both set of) image bits, especially where the image data is to be reliably co-identified with collateral document data. Such "identification-bits" should be carried with the image data through the various stages of processing, so the image's identity can be maintained at each processing station, and can be transferred to a downstream processing station. Such identification-bits should be available at the point where the front and rear image data, and "collateral document data" are merged to ensure that a full, correct data set is being combined for transfer to the database. A salient object hereof is to so identify image data; especially with "sync bits" as detailed below.

BRIEF DESCRIPTION OF THE DRAWINGS

For a more complete understanding of the present invention, and advantages thereof, reference may be made to the following detailed description taken in conjunction with the accompanying drawings, in which:

FIG. 1B is a block diagram indicating the transfer of "sync-tag" data through such a document processing system; while

FIG. 2A is a block diagram of image processing portions of such a system indicating exemplary use (flow) of "sync tag" data according to this invention, while

DETAILED DESCRIPTION

Figure 1A:
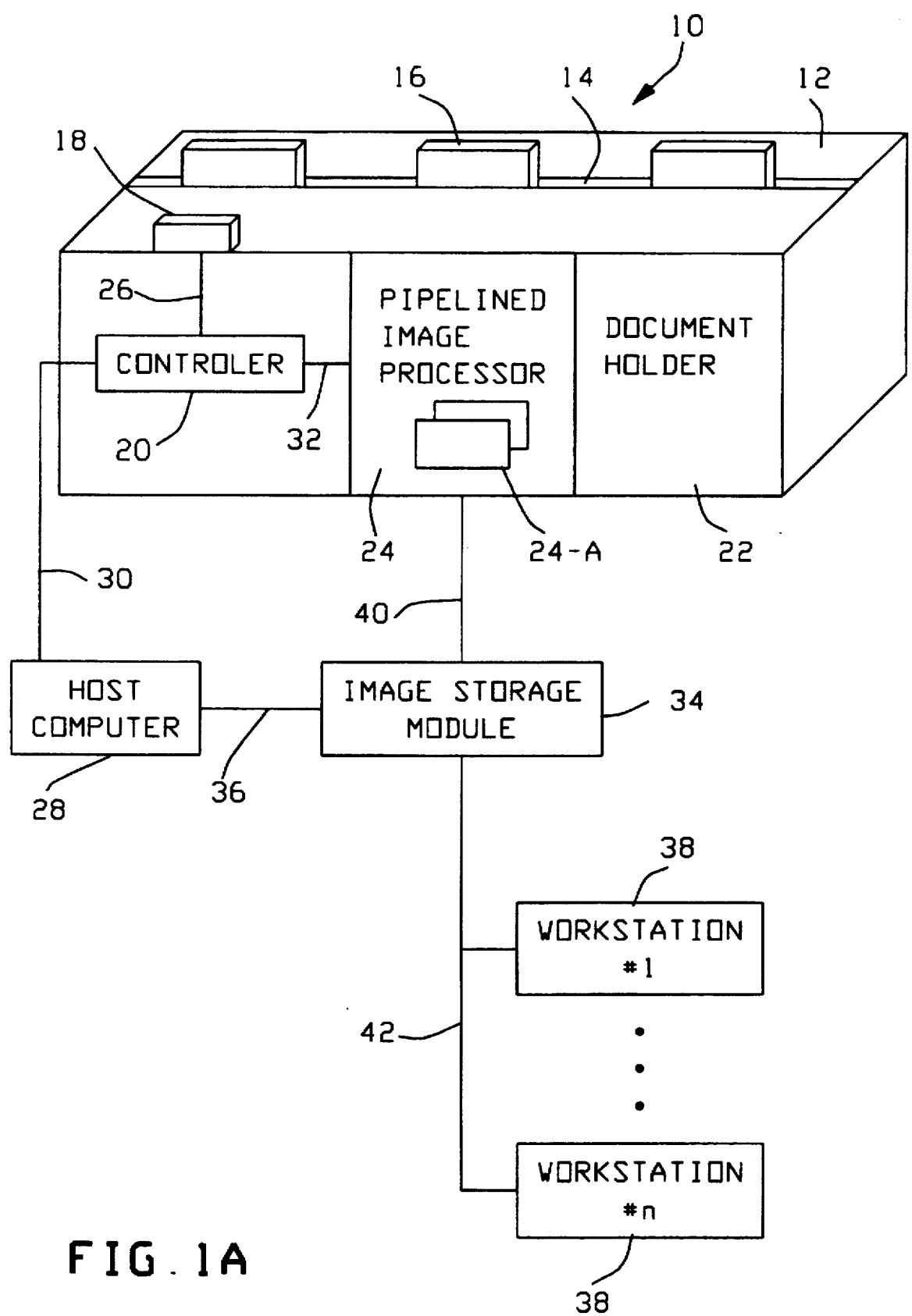
FIG. 1A is a generalized block diagram of a typical document processing (sorting) system.

Conventional Solution ("OLD WAY") for Synchronization:

In a more conventional solution for this problem, all transactions between processing stations would be performed on a first in, first out (FIFO) basis; while assuming, for instance, that four different associated data queues (front image, rear image, collateral document data, and image "status") will remain in synchronization. The only validation of genuine synchronization would be via the physical dimensions of an image (e.g., as embedded in the image data, along with "image status"). However, when processing documents of a single uniform size, this isn't worth much.

Put differently, one would say it is important not to mis-identify a document's image data—a need addressed by FIFO architecture as mentioned.

But in a "JPEG compression" environment one becomes especially concerned lest images exit the compression hardware (Histogram/Compressor, HC) to the JPEG Compressed Data Buffer (JCDB)) in an order different from the entry order. This can be a result of the differing times that different images take to be compressed. System software needs a way to know the order in which documents are exiting compression (if not FIFO).

One way to do this is to inject a unique identifier (e.g., via the hardware) to be carried along with the image data (e.g., while the images are still arranged FIFO). We propose such a unique identifier; we call it a "synchronization tag" (sync tag). It can be used by system software to re-sort image data to FIFO order (i.e., the order expected). Thus, this "sync tag" can be used to guarantee the integrity of the relation of the image data to other data associated with the document (such as codeline data). In practice, the images will preferably be retained in a FIFO order by the final HC hardware implementation. The sync tag can be retained as a solid integrity check.

Integrity concerns

It seemed that such a "sync tag" was a good way to help assure "integrity" of image data. Now, for a system to have integrity, it should comply with a few basic principles. First and foremost, a system should have an inherent ability to detect that an operation being performed is malfunctioning, i.e., is not correctly completing a requested operation or that it is attempting to perform an invalid operation. Note that the method for detecting the malfunction is not really important as long as data integrity is not lost. Note also that retry or recovery operations are possible.

Secondly, progression of the system from state to state must be predictable and deterministic for all given inputs and definable states. Thirdly, upon detecting a loss of integrity, the logic element must have an ability to suspend processing and to inform external controlling elements of the error, while also allowing for viewing of the internal states and variables without corrupting or losing control of the stated operations. Ideally, this viewing should be provided so that retry and recovery can be performed naturally, and without additional difficulty.

Such a definition is well adapted for the cited JPEG compression. We find that using sync tags addresses the first two (of these three) points of integrity, namely, a way to detect malfunction (comparison of input and output sync tag values) and a deterministic way to define all states (e.g., see the defined sequence of sync tags). The third point of integrity is preferably provided in the hardware by "status registers" with "sync tag error status bits", and also in the software; especially by polling the status registers and by "sync tag error reporting" and "stop document flow" messages.

This integrity concern spans the components (both hardware and software) between the injection point and the check point. Because of this, a sync tag should be inserted as early as possible in the imaging process. This would logically be at the camera board, or the image digitizer board; but in certain cases (e.g., here) it is inconvenient to do this. Thus, here we prefer to set the sync tag "inject-point" at the normalizer/scaler (NS) board this is the first board in the imaging process and is specially adapted to the JPEG design.

As mentioned, the sync tag should be checked by each component (hardware and software) through which the image or image data passes downstream from the injection point. Since the maintenance philosophy of the product involves board level replacement, the sync tag should be checked by, or for, each board. Some checks can be done in hardware, but other checks must to be done in software; for example, the master and slave NS boards run in parallel on their parts of a single image. The boards may appear to be in sync internally, but it is best if an external agent (system software) check the sync tags exiting this stage of image processing to see if the two NS boards agree. This we prefer to do.

Breakdown of integrity (of the image data relationship to the rest of the document data) can exist in the entity being checked, or in the entity doing the checking. In either case, the breakdown will be detected here, so appropriate recovery action can be initiated.

Increasing the span over which the sync tag is used thus improves integrity over that span. Ideally, the sync tag should be assigned and injected as the image is captured and recycled (after the image has been verified to be placed on the storage medium). In practice, due to limitations on queue sizes and on designs, the span is from the NS boards to delivery of the image data to "communications" (i.e., to the means responsible for sending it to the communications stage which is responsible for sending it to the storage medium. Importantly, this is the span over which a loss of synchronization integrity is most likely to occur.

The sync tag also provides coordination between the front and back images.

Sync tags are preferably assigned increasing integer numbers from 0 to 255; thereafter the numbering preferably starts over at zero, though this is not required. Sync tags can be assigned in any order, as long as each entity checking the sync tag knows the order; for example: increasing even numbers, decreasing odd numbers, prime numbers, etc.

Sync tags here are preferably assigned increasing integer numbers from 0 to 255 because this is derived from the DOCID assigned in the DOCUMENT DATA FIFO in the CAR Port board. The DOCID is generated by the system software running in the sorter module.

New Solution (Preferred Embodiment)

Thus, we prefer, according to a feature hereof, to use a "sync tag identifier" (i.e., identifying bits that help synchronize) which is assigned to a document and is used to track that document through the Imaging Module. This "Tag" is preferably used by each software and hardware entity that performs functions on a per-document basis. [No "synchronization" or other time-based check should be inferred.]

Figure 1B:
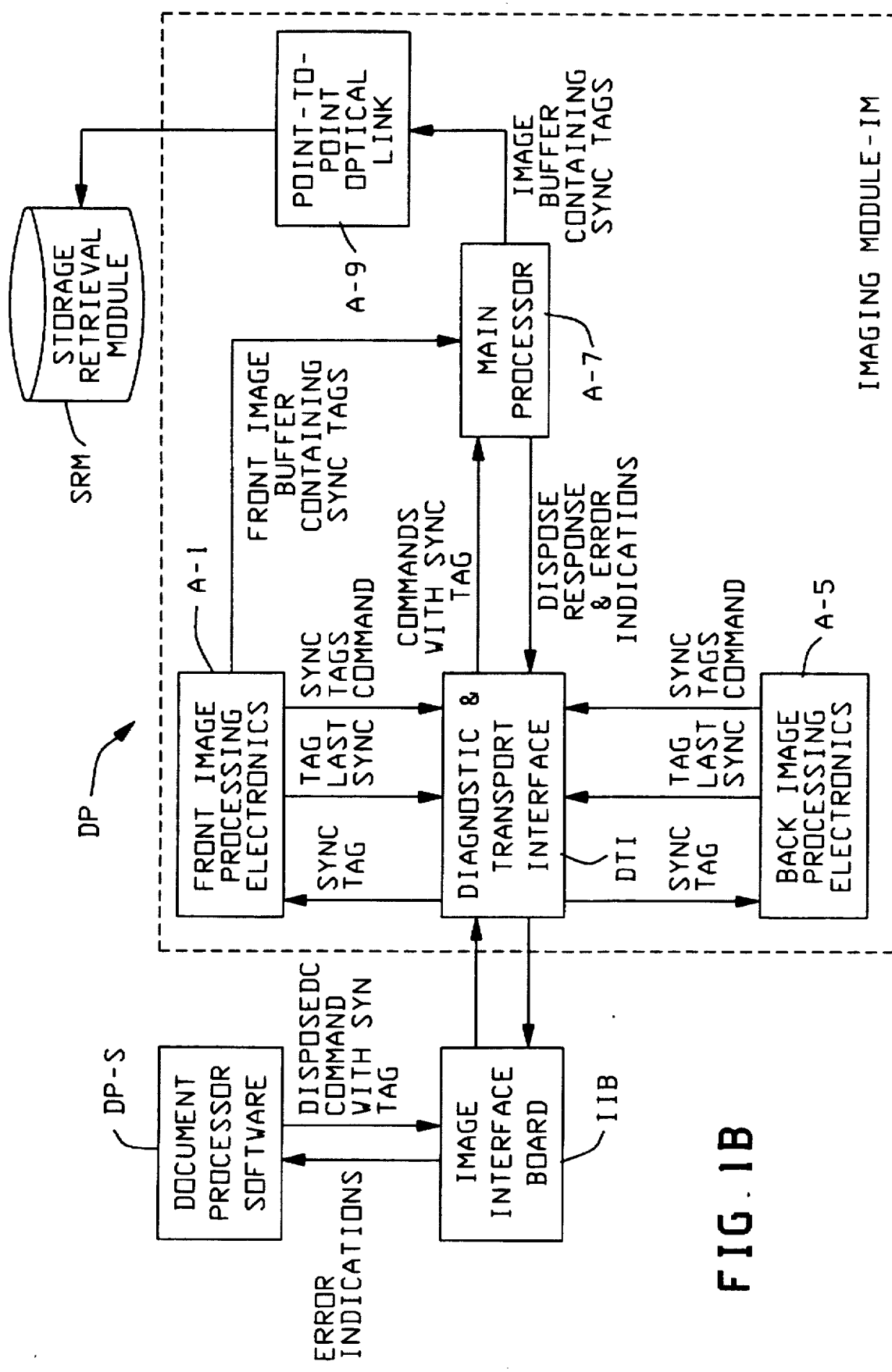

For instance, consider Document Processor DP schematically indicated in FIG. 1B and including an image interface unit (board) IIB and associated processing software DP-S, fed by an Imaging Module IM, including a pair of Front-/Back image processing units A-1, A-5 to develop respective electronic, digital document image data, as aided by a Diagnostic/Transport Interface DTI. This electronic image data is passed to a Main Processor A-7, and may be stored in a Storage-Retrieval unit SRM, being linked to processor A-7 via a Point-to-Point Optical Link unit A-9, as known in the art.

In this system, it will be understood that an Electronic Camera and an Image Digitizer operate to process video scan lines, but that they perform no operations on a per-document basis, and therefore do not use "sync tags" Here, the "sync tags" are preferably arranged to originate with the Document Processor Software (e.g., see FIG. 1B, element DP-S) as workers will appreciate.

Sync-Tags, In General

Figure 2:
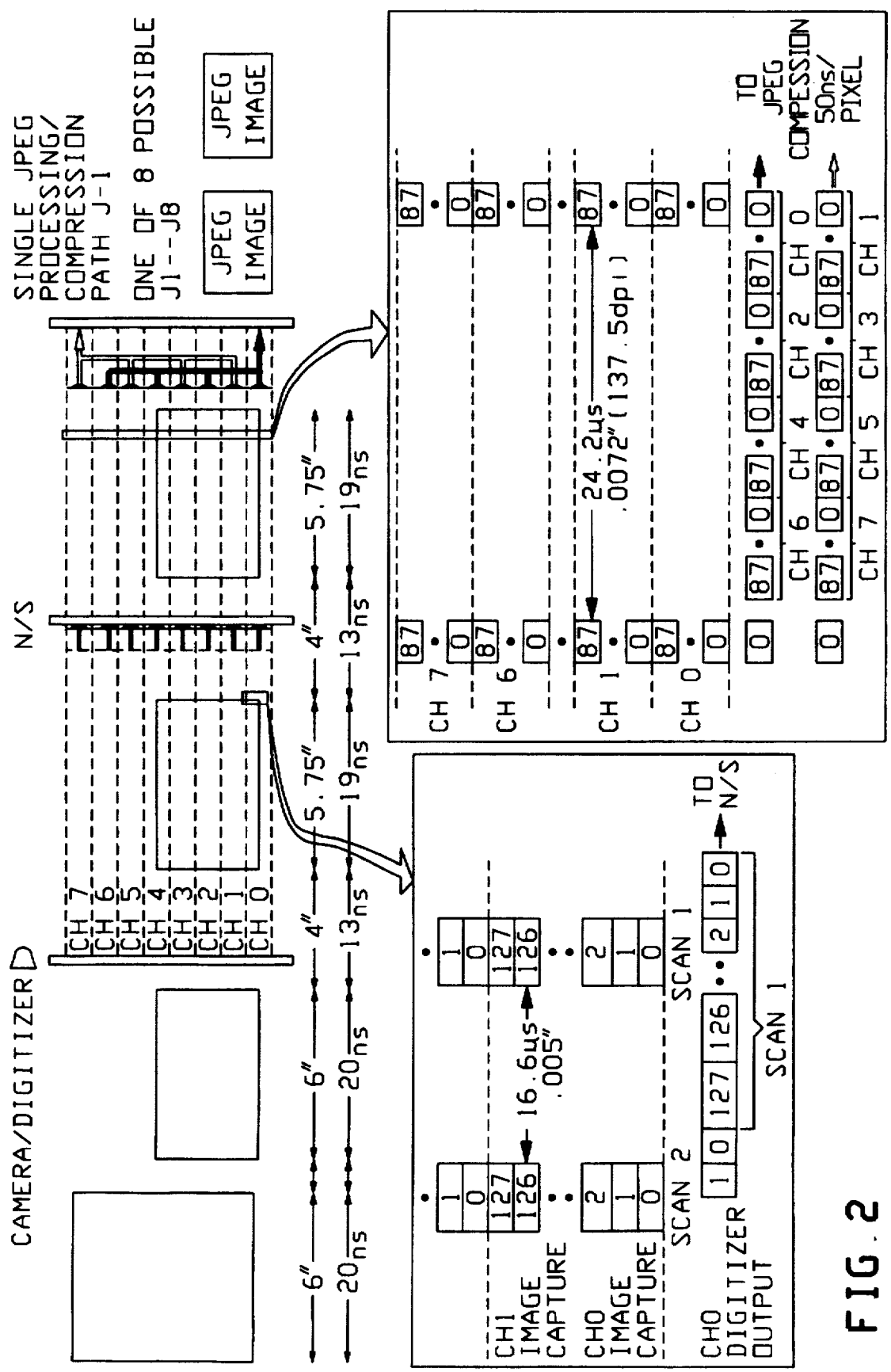
FIG. 2 illustrates the functions of Digitizing, Normalize/Scaling (N/S) and Processing/Compression of an exemplary document.
Figure 2A:
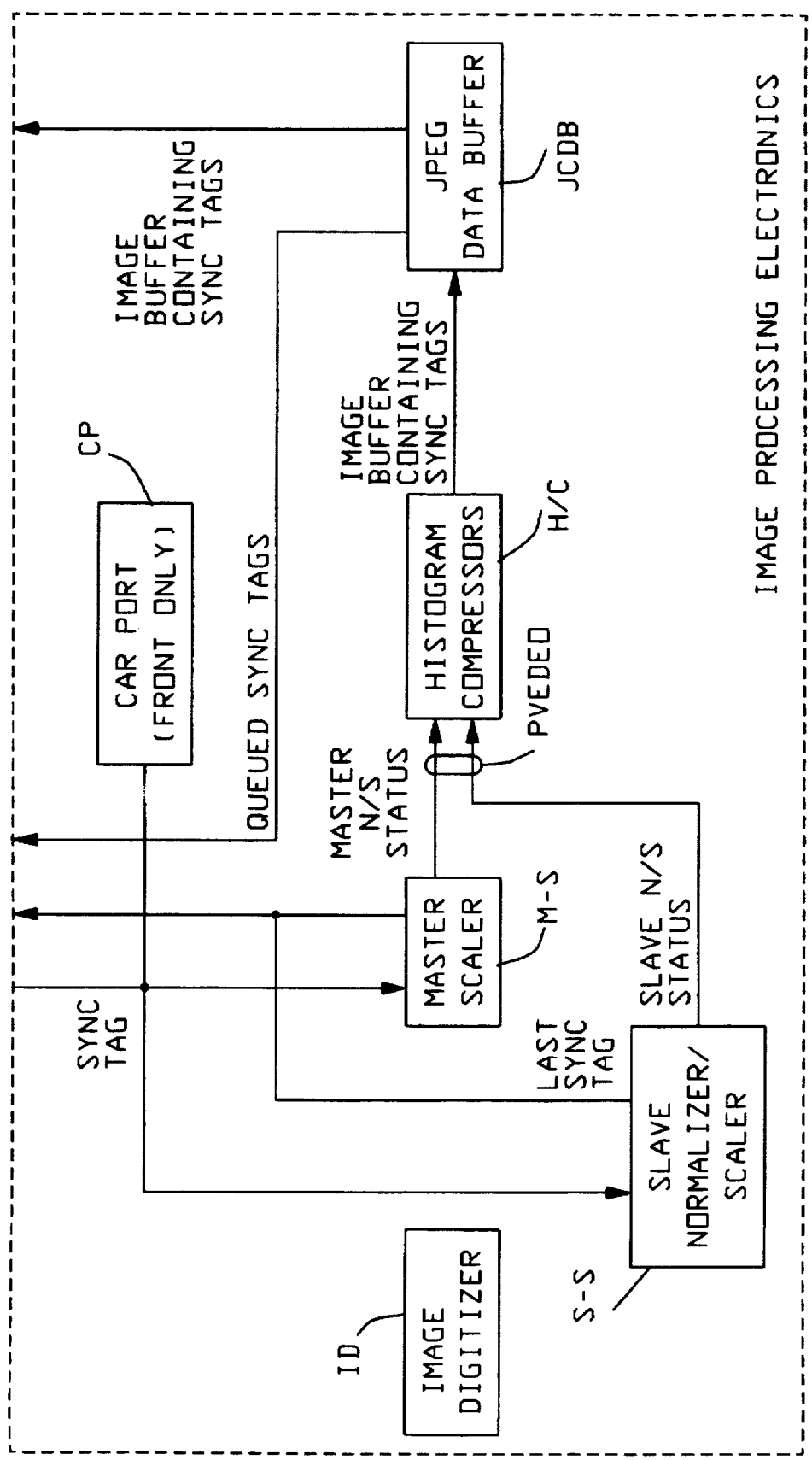
Figure 3:
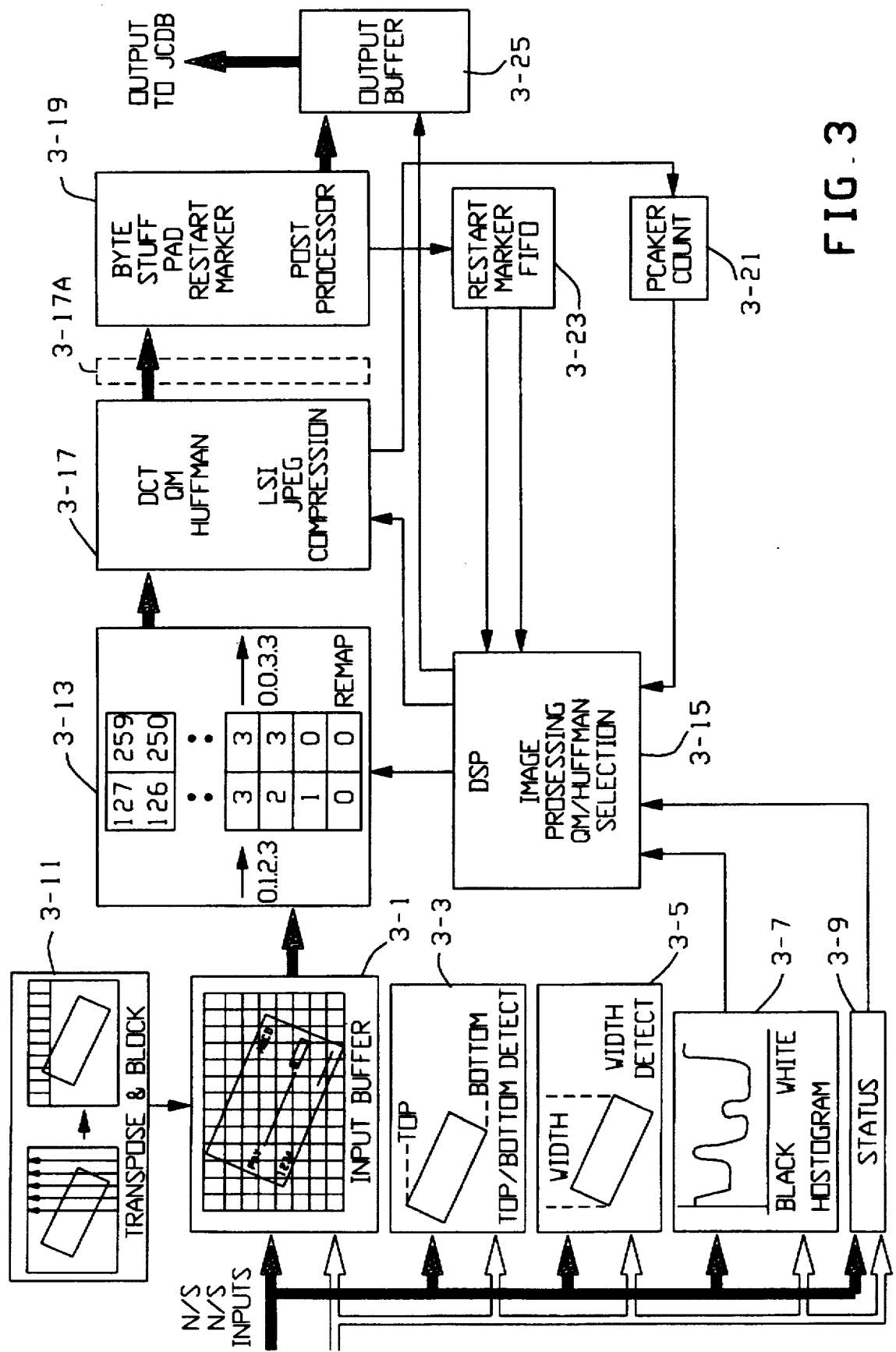
FIG. 3 is a block diagram illustrating a single Processing/Compression path in such a system.

FIG. 2A illustrates a "flow" of "sync tag" information through the image processing electronics of a document processor (e.g., like that of FIG. 1B, Imaging Module thereof) to a Storage and Retrieval Module, SRM. The "sync tags" preferably originate within the document processor software, and are returned to the document processor software, providing an end-to end check of the integrity of image generation.

The "sync tag" for a document is preferably assigned by software executing in the document processor. That software produces information indicating the operations that the document processor/imaging module are to perform on the document as it travels to its assigned sort-pocket; this is the "Dispose Command". Part of this Dispose Command is the sync tag and image information. The Dispose Command is transferred by the Image Interface IIB (FIG. 1B) to the Imaging Module IM.

Figure 1C:
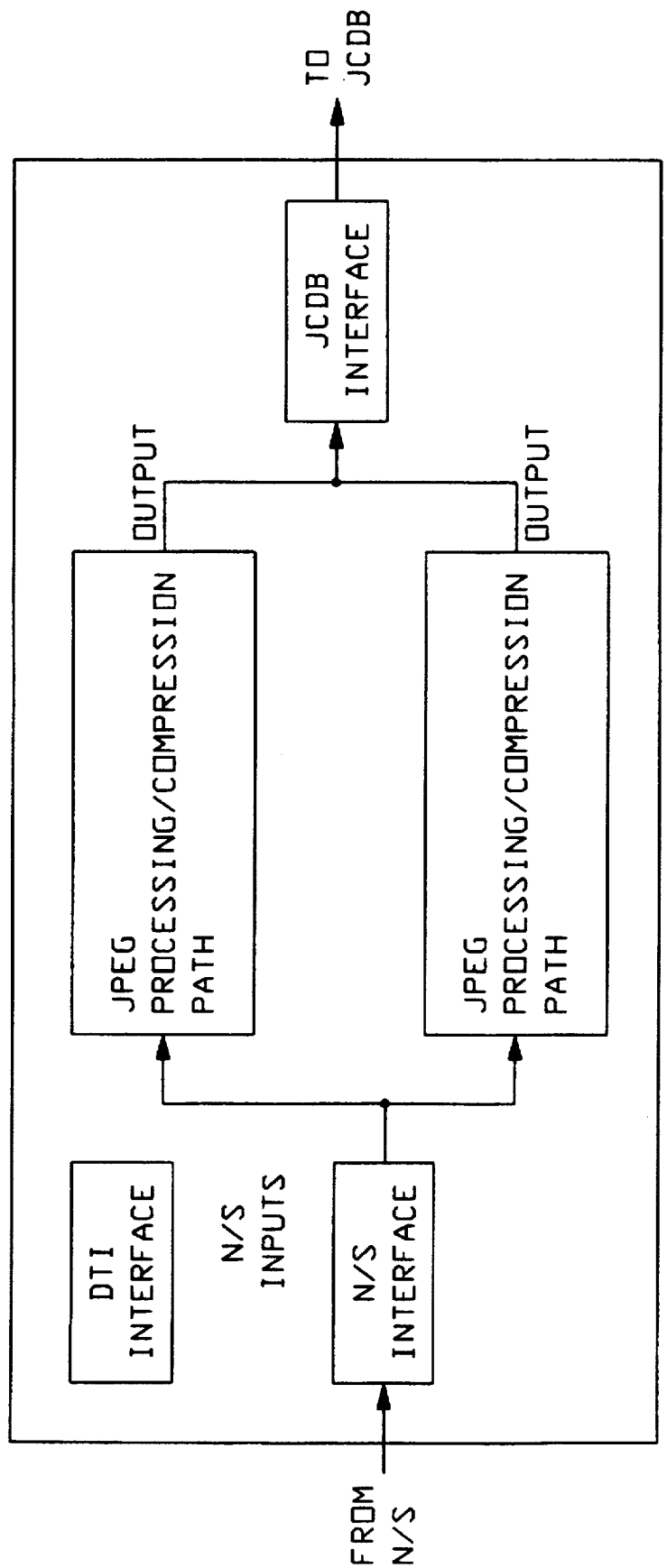
FIG. 1C is a like showing of a dual-path Histogram/Compressor unit thereof.

Salient units of image processing electronics are indicated in FIG. 2A, including image digitizer 1D, front CAR Port $C_F$ (accepts Courtesy-Amount-Reader data, as known in the art), with a Buffer JCDB (JPEG Data Buffer, also see FIGS. 1C and 2) fed by a Histogram/Compressor Stage H/C that is, in tern, by a pair of Normalizer/Scalers (Master N/S, M-S and Slave N/S, S—S). Sync-tag data is fed to Scaler M-S (e.g., from Document Process Software, so DP-S, FIG. 1B).

Figure 5:
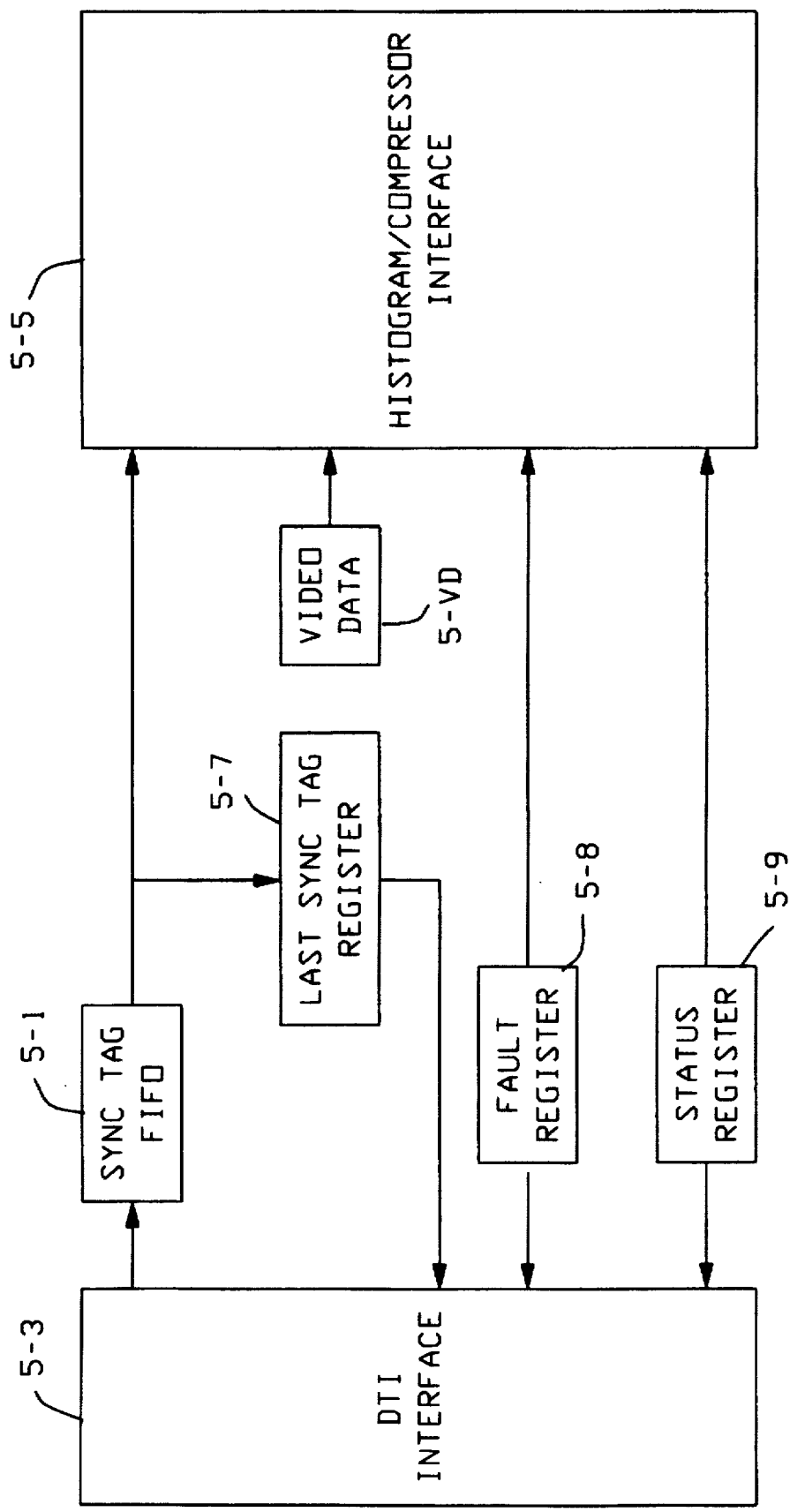
FIG. 5 details the makeup of a preferred Normalizer/Scaler Unit.

A preferred Normalizer/Scaler organization (re sync-tag) is indicated in FIG. 5 as a Sync-Tag FIFO register 5-1 coupled between an interface 5—5 to the H/C stage and an input (DT1) interface 5-3, with a "Last Sync-Tag register" 5-7 in parallel therewith. Fault registers 5-8 and Status registers 5-9 are also so coupled.

Figure 6:
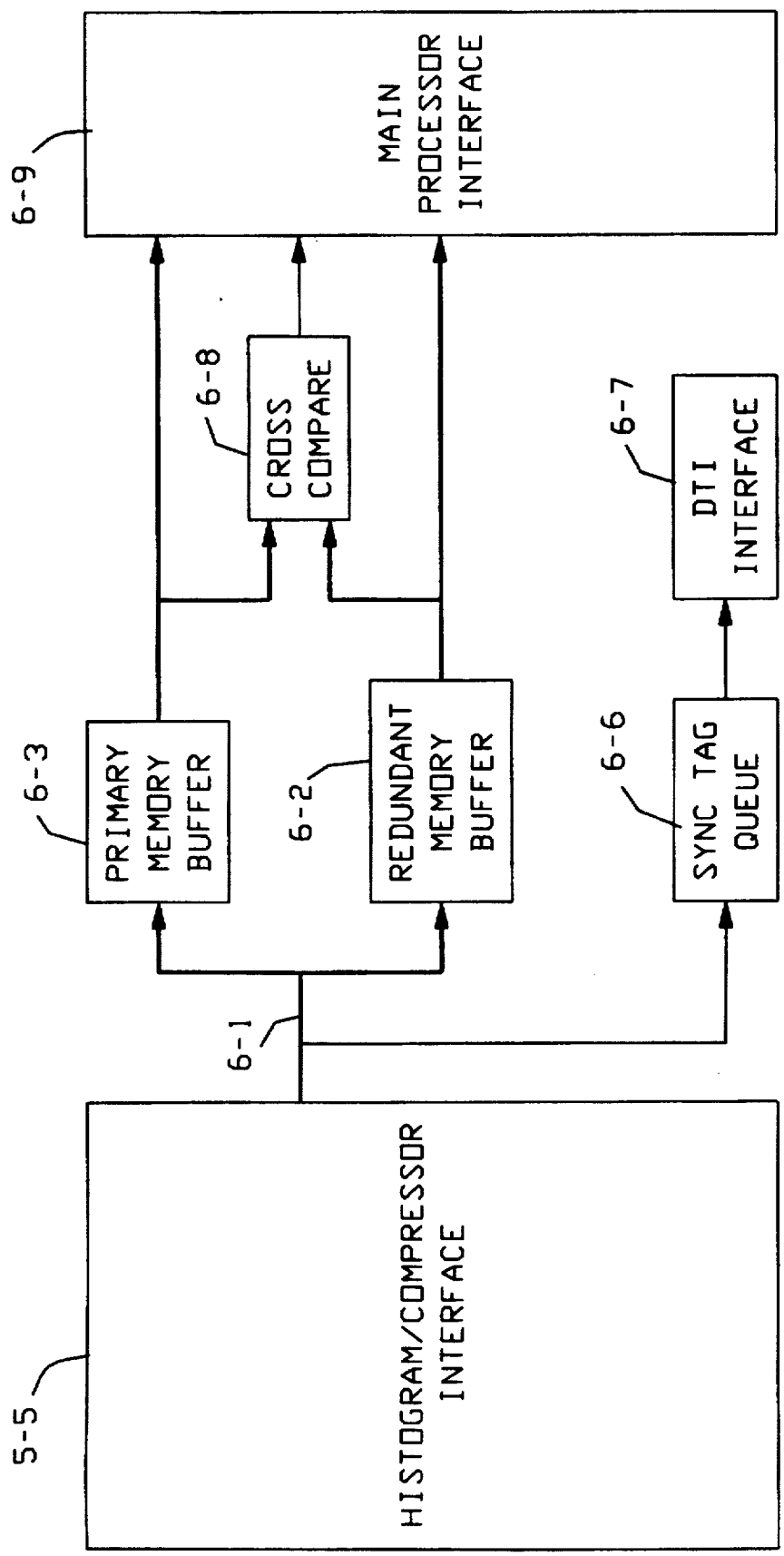
FIG. 6 gives the makeup of a preferred JPEG Compressed Data Buffer.

A preferred organization of JPEG Compressed Data Buffer JCDB (e.g., see FIGS. 1C, 2A, 3 and 5) is indicated in FIG. 6 as a pair of Primary-, Redundant Memory buffers 6-3,6-2 coupled between H/C interface 5—5 (see FIG. 5) and Interface 6-4 to the Main Processor, with a Cross-Compare Stage 6-8 in parallel to Interface 6-4. A Sync-Tag Queue Unit 6—6 and associated DT (Diagnostic Transport) Interface 6-7 (see FIG. 1B) also input by H/C Interface 5—5.

Diagnostic and Transport Interface Use of Sync Tag

According to this embodiment, when a Diagnostic and Transport Interface (DTI) receives such "disposition information" (e.g., FIG. 1B, as above) from the document processor, it extracts the sync tag information and passes the sync tag value to Sync Tag FIFOs in the Normalizer/Scaler (N/S) units (e.g., see FIG. 5) for the front and back image processing electronics. Then, this disposition information is passed to the Main Processor (A-7, FIG. 1B).

When the DTI receives an "interrupt" from the Normalizer/Scaler units, it begins a timeout for the item to complete compression. The DTI then reads the "Last Sync Tag Register" from both Normalizer/Scalers (e.g., see FIG. 5), and verifies that the sync tag that was read matches the sync-tag in the "Dispose Command". If either sync tag is "incorrect" (i.e., does not "match"), then the DTI requests the Main Processor to "Stop Flow".

When the DTI receives an interrupt from a JPEG Compressed Data Buffer (JCDB, FIG. 2A: described above), it reads the Sync Tag Queue for the interrupting JCDB. If the sync tag has the expected value, then the "timeout" for the item to complete compression is disabled. If the sync tag does not have the expected value, the DTI requests the Main Processor to "Stop Flow". If this is the second JCDB interrupt for this item (that is, if the interrupt from the JCDB from the other side for this item has been processed or has timed-out), then the "status" for this item is sent to the Main Processor A-7.

Sync Tag Usage in Main Processor

The Main Processor (A-7) compares the master N/S sync tag and the slave N/S sync tag in the JCDB memory buffer for the interrupting JCDB. If the sync tags do not match, then Processor A-7 uses the sync tags from the redundant JCDB memory buffer (see 6-2 , FIG. 6) to determine if the fault lies in the JCDB memory buffer, or in the input data from the Histogram/Compressor (H/C bus, 6-5, FIGS. 5, 6). The "status" from the H/C within the JCDB memory buffer indicates if the H/C detected a mismatch in the sync tags as they were received from the N/S boards.

Main Processor A-7 compares the master N/S sync tags from the front and back JCDB buffers with the sync tag in the next queued "disposition information" and the sync tag in the "status" bits from the DTI, to verify that the sync tags from all four sources match. The main processor also transmits the "sync-tag" to the Document Processor Software (DPS, FIG. 1B) when processing is complete.

Sync tag Flow in Imaging Processing Electronics

FIG. 2A illustrates sync tag "flow" through image processing electronics (for handling the image of one side (assume Front side) of a document. Note: The front and back sides of the document are processed by like, separate sets of electronics. The "intermediate" and "final" sync tags produced are examined by the programs executing in the Imaging Module, to verify that the sync tags remain in sequence for a particular side, and that they match between the two sides.

Assume each Normalizer/Scaler (Master and Slave) completes its processing of a document (image data)—then if the Sync Tag FIFO is not empty (e.g., see FIG. 5), the system assigns the sync tag value at the "head" of the Sync Tag FIFO for the document. But, if the Sync Tag FIFO is empty, the Normalizer/Scaler assigns a sync tag value equal to the value in the "Last Sync Tag Register" for the document, and sets a Sync Tag FIFO "underrun bit" in one of its "fault registers" (e.g., see FIG. 5), internal to each Normalizer/Scaler.

In either case, the Normalizer/Scaler then stores the sync tag value in the "Last Sync Tag Register" (e.g., FIG. 5), and then assembles and transfers the sync tag and status data for the document to the Histogram/Compressor and interrupts the DTI, and removes the entry at the head of the Sync Tag FIFO.

Figure 4:
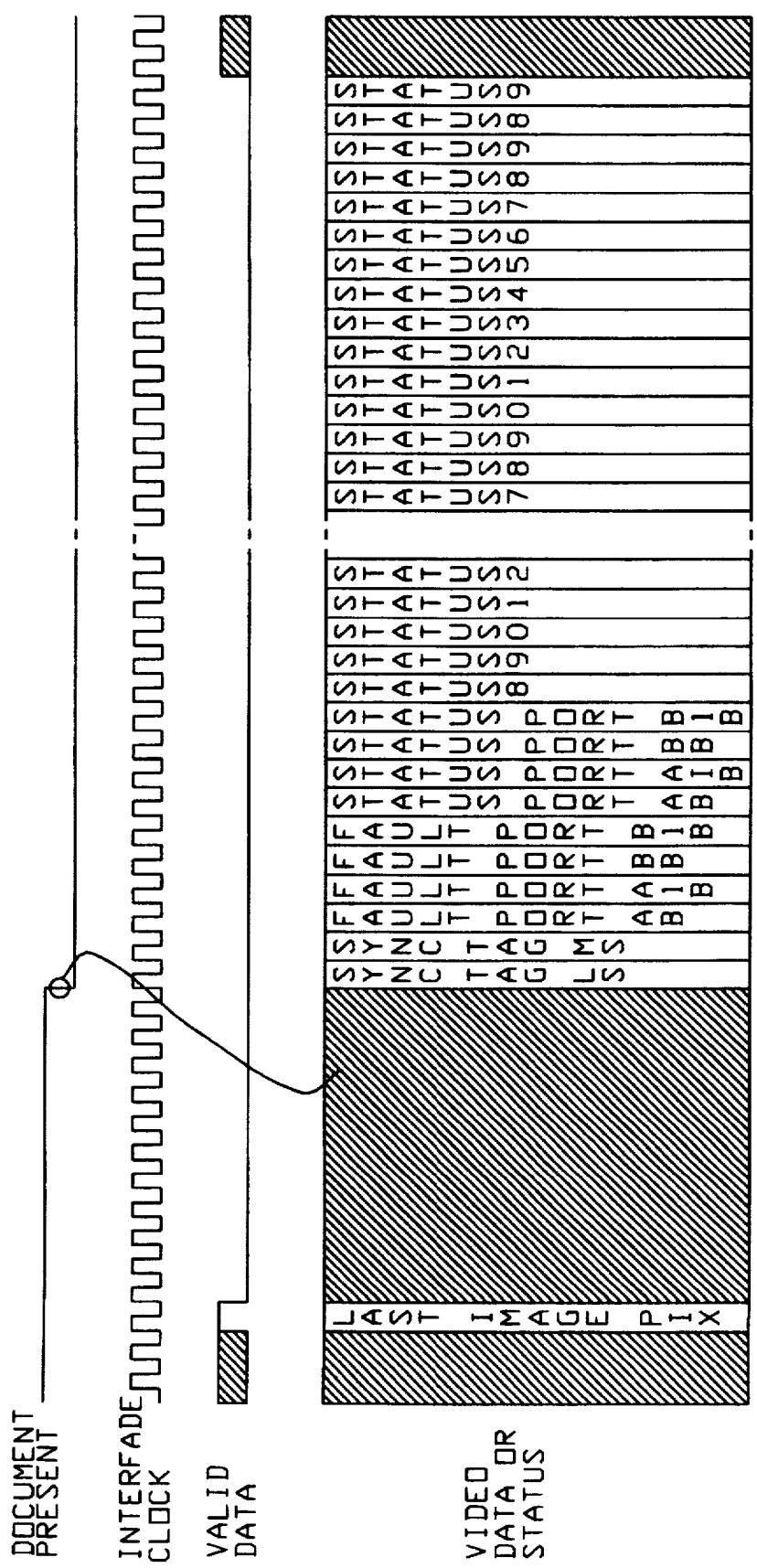
FIG. 4 is a plot of related exemplary processing signals and video/status data.

The transfer of "status" data (conventionally developed as workers realize) from the Normalizer/Scaler to the Histogram/Compressor array H/C follows the final scan line of an image, using the same bus as the image data (e.g., illustrated exemplarily in FIG. 4). Following the transfer of the last pixel of an image, from the Normalizer/Scaler boards to the Histogram/Compressors, a "document present" signal (PDOCPRES_N) will usually remain in an inactive state, with the "valid video" signal (PVALID_N) inactive until the status and sync tag bits associated with the image data are ready for transfer to the Histogram/Compressor boards. Coincident with this PDOCPRES_N signal going inactive, the least significant byte of the sync tag from each Normalizer/Scaler board is transferred over a "processed video" (PVIDEO) bus (e.g., see FIG. 2A).

At the next clock, the most significant byte of the sync tag from each Normalizer/Scaler board is transferred over the PVIDEO bus. During each of the next (30) clock cycles, one byte value may be transferred over the PVIDEO bus to the Histogram/Compressors by each Normalizer/Scaler. Multiple-byte information is transferred, least significant byte first.

The Histogram/Compressor includes the sync tags and "status" bits received from the Normalizer/Scaler boards in its "compressed image buffer" (see Output Buffer, FIG. 3)—these bits are transferred to the JPEG Compressed Data Buffer. (e.g., see FIG. 2A). The Histogram/Compressor compares the sync tag bits received from the Master Normalizer/Scaler board with those received from the Slave Normalizer/Scaler board, and a "fault" is declared if they are "unequal". This fault data is also included in the image data that is transferred from the compressed image buffer to the JPEG Compressed Data Buffer.

The JPEG Compressed Data Buffer (FIG. 2A) extracts the sync tags from the Master N/S as data is received from one of the Histogram/Compressors. This sync tag is placed in a queue which can be read by the DTI. (When an entry is "read", it is removed from the queue.) An "interrupt" in presented to the DTI whenever this queue is not "empty".

"New Way" Reprised

The "new way" here-described provides for a positive identification of electronic document image data at every processing station in an imaging module that performs operations "on a per-document basis" (e.g., see DPS and Main Processor in FIG. 1B), from the time the image data is first delineated until its data packet is sent for storage to the database.

In the "old way", all transactions between processing entities would be performed on a first in, first out (FIFO) basis, in general, while assuming that the four different associated data queues (front image, the rear image, "collateral document information", and image status) remained in synchronization. But this isn't a reliable assumption, since synchronization could be verified only via physical document dimensions (e.g., as embedded in the image data), and by "image status"; however, when processing documents of uniform size, this is worth little.

But using "sync tags" as here taught can be quite advantageous; e.g., when made available to the DTI at the Normalizer/Scaler and JCDB boards to verify the integrity of the DTI's image processing electronics and its internally maintained queues, since each entry in a queue also contains the sync tag—remembering that the sync-tags facilitate rapid, reliable detection of a malfunction which throws the Front/Rear image-bits out of sync.

Also, sync tags may be used during debugging to easily identify the various pieces of image data and other, collateral, data associated with a particular document image. Having the sync tag embedded into image data (e.g., like "status") allows this fundamental information to be easily correlated, whereas the "old" way gives no such convenient identifier/synchronizer.

While the invention has been described in connection with the presently preferred embodiment, the principles, of the invention are capable of modification and change without departing from the spirit of the invention as set forth in the appended claims.

What is claimed is:

1. An electronic Front/Rear check-imaging arrangement for detecting a malfunction which throws the Front/Rear image bits out of sync comprising: imaging means which generates imaging-bits representing Front/Rear faces of a given check via digitizer means, with a common array of sync-tag bits embedded with the imaging bits for each said check in order to assure that the tag bits for such imaging bits of a given check are the same for both Front/Rear faces, these sets of imaging bits thereafter being transferred, on a "per-document basis", to various successive electronic compression and other processing stages wherein said compression is performed and completed in "real-time" and using N pairs of parallel compression paths and wherein a "FAULT" signal indicating said malfunction is generated when said sync-tag bits do not match and, operating in "real time", finally, to a data base storage means (DBS); this arrangement also including sync-tag means constructed to create said sync-tag bits unique for each such imaged check-face and to transfer these sync-tag bits with the imaging bits for both check faces to each such processing stage for handling the Front/Rear imaging bits, on a per document basis, and finally to DBS interface means for final matching between faces, and removal of the sync-tag bits.

2. The invention of claim 1, wherein said tag bits are checked at some or all of said processing states.

3. The invention of claim 2, wherein said tag bits are embedded with the imaging bits for each check.

4. The invention of claim 3, wherein two or more imaging means are involved, each generating a respective set of imaging bits, with a common array of tag bits for each said check, these sets of imaging bits thereafter being presented to interface means, including compare means, to assure that the tag bits for such imaging bits of a given check are the same for both Front/Rear Faces.

5. The invention of claim 4, wherein said imaging means constitute Front and Rear camera means generating respective Front and Rear sets of imaging bits, each set being merged with common related set of tag bits uniquely identifying the common check.

6. The invention of claim 5, wherein said Front and Rear sets of imaging bits/tag bits are transferred to common processor stages via a single transfer stage (DT), along with "collateral bits" including "status bits" and wherein this transfer stage DT reads and checks each pair of tag bits before transferring the image bits/tag bits onward and causes a "FAULT" signal to be generated when they do not match.

7. The invention of claim 6, wherein all said pairs of bits are stored in Queue means in such transfer stage, and said transfer stage automatically issues INTERRUPT wherever its said Queue means is "Not Empty".

8. The invention of claim 7, wherein associated program means is adapted to generate said tag bits and to monitor the match thereof before allowing a "valid" final transfer to said storage means.

9. The invention of claim 8, wherein such "status bits" are also transferred with their associated image bits.

10. The invention of claim 1, wherein said electronic processing stages include a Histogram/Compressor stage (I/C) fed by Normalizing/Scaling means (N/S), and wherein said tag bits are transferred to said N/S means and thence to said H/C means.

11. The invention of claim 9, wherein said tag-bits are so transferred along with respective status bits, after the final scan of a check, using the same bus as for said imaging bits.

12. The invention of claim 10, wherein said N/S means includes "Last set register" means for storage of respective tag bits and later transfer to said H/C means.

13. The invention of claim 11, wherein said image bits are JPEG data bits and are input from said stage (H/C) to JPEG Data Buffer means in route to said final storage means.

14. The invention of claim 12, wherein said N/S means include Tag Register means input from DT interface means and output to H/C interface means.

15. The invention of claim 14, wherein said N/S means also includes "Last tag" register means input to said DT interface means.

16. The invention of claim 15, wherein said N/S means also includes Fault register means and Status register means.

17. The invention of claim 15, wherein said DT interface means includes Queue means adapted to automatically be interrupted when "Not empty" and to periodically remove the data at the head of said Tag Register means.

18. The invention of claim 16, wherein said stage (H/C) means is coupled to Compressed Image Data buffer means which, in turn, is coupled to input JPEG Buffer means.

19. The invention of claim 18, wherein both said buffer means are adapted to also store "status bits" with each imaging/tag bit set.

20. The invention of claim 14, wherein said N/S means comprises Master N/S, Means and Slave N/S means, each coupled to receive associated imaging/tag bits in parallel, and both are coupled to common compare means adapted to issue a "FAULT" signal if the tag bits therein do not match for a given set of imaging bits.

21. The invention of claim 18, wherein said "Status bits" are transferred with said imaging bits.

* * * * *